Dec. 1, 1936.  C. S. BROWN  2,062,390
SEWAGE REGULATOR
Filed April 30, 1936   3 Sheets-Sheet 1

Inventor
Chalmers S. Brown

Dec. 1, 1936.                C. S. BROWN                    2,062,390
                           SEWAGE REGULATOR
                         Filed April 30, 1936          3 Sheets-Sheet 3

Inventor
Chalmers S. Brown
By Faust F. Crampton
Attorney

Patented Dec. 1, 1936

2,062,390

UNITED STATES PATENT OFFICE 2,062,390

SEWAGE REGULATOR

Chalmers S. Brown, Lima, Ohio

Application April 30, 1936, Serial No. 77,077

3 Claims. (Cl. 137—78)

My invention has for its object to provide means for producing a constant quantity flow of sewer water, such as to a sewage disposal plant, notwithstanding the variation in the amount of drainage water that may accumulate in any particular locality. The invention provides means for accumulating the surplus of water during abnormal conditions, such as occurs in precipitation or a thawing of snow and ice, to prevent more than the normal supply of sewer water to a disposal plant, and it has for its object to maintain a constant quantity flow of the tail water leading from any particular locality to a disposal or discharge point, notwithstanding the variation of the level of accumulated water.

The invention provides a chambered structure to which the water flows and an outlet pipe through which the water is discharged to a point of disposal and a float operated gate valve controlled by the level of the water in a float chamber and operative in turn to control the discharge of the water from a receiving chamber into the float chamber, the float chamber having an outlet, restricted in area relative to the cross-sectional area of the outlet pipe, to maintain a difference in the levels of the water in the float chamber and the pipe to accentuate the relative movements of the float and maintain a constant flow in the outlet pipe, notwithstanding the changes in level of the water in the receiving chamber.

The particular object of the invention is to produce an increase in the depth of the water in the float chamber faster than the increase in the depth of the water in the outlet pipe to which the water is delivered from the float chamber.

The invention may be contained in structures or apparatuses of different forms and to illustrate a practical application of the invention, I have selected a structure containing the invention and shall describe hereinafter the particular structure selected. The structure selected is shown in the accompanying drawings.

Figure 1:
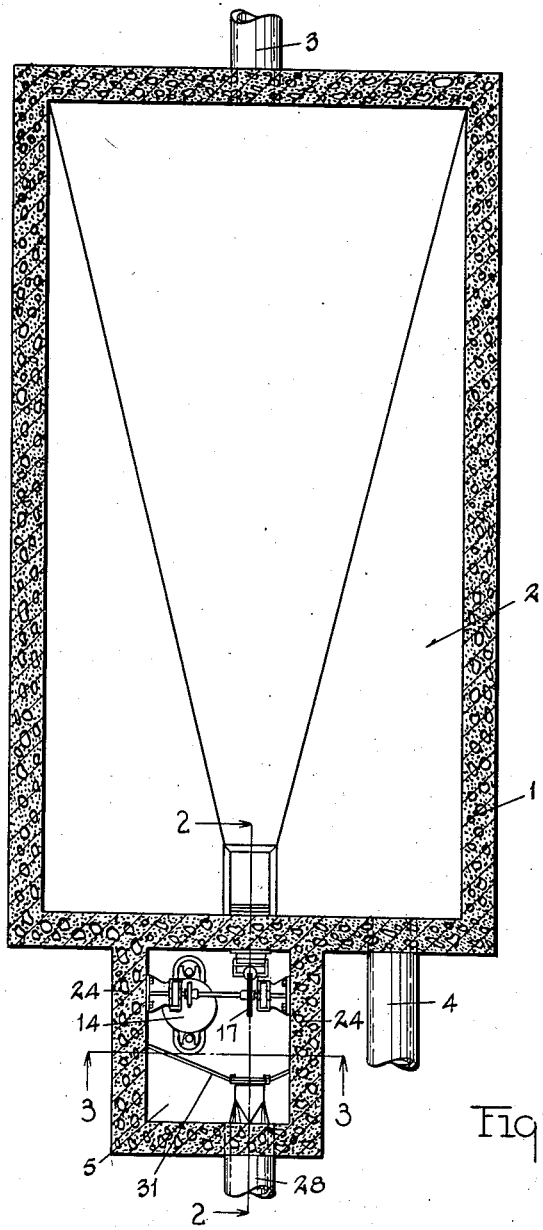
Figure 2:
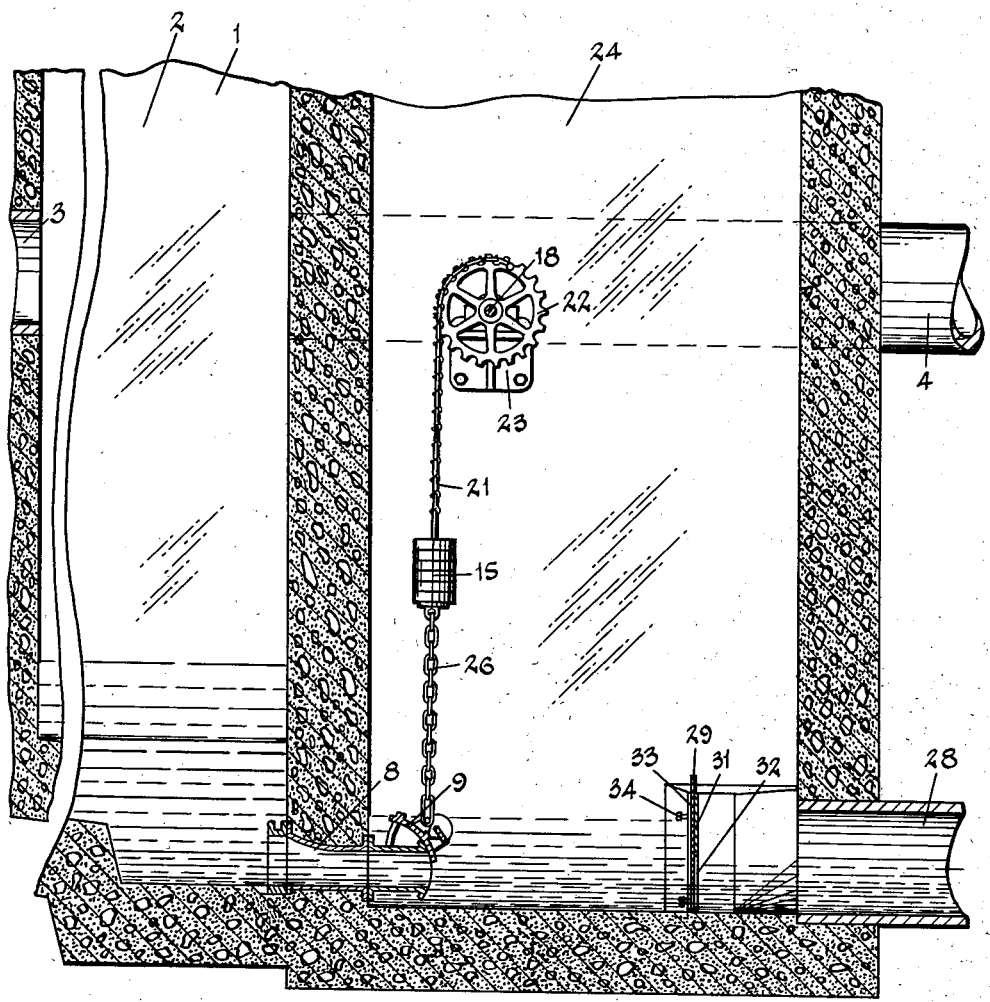
Figure 3:
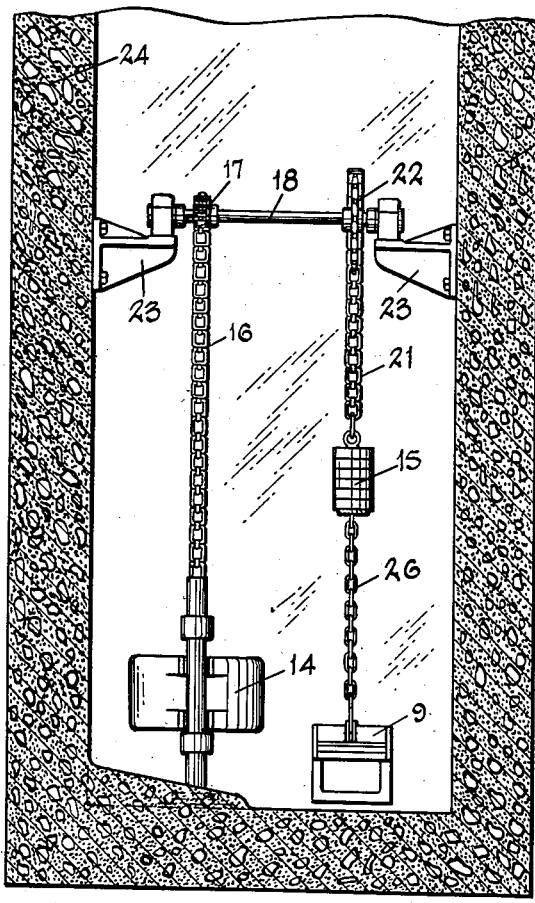
Figure 4:
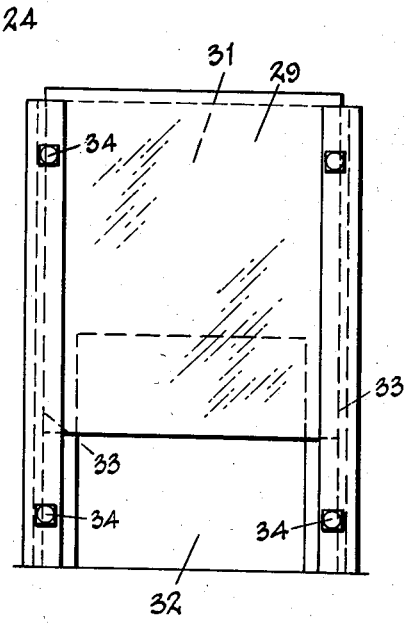

Fig. 1 illustrates a view of a horizontal section of the chambered structure. Fig. 2 illustrates a view of a section of the float chamber and a broken view of the water receiving chamber. It is a view of a section taken on the plane of the line 2—2 indicated in Fig. 1. Fig. 3 is a view of a section of the float chamber taken on the plane of the line 3—3 indicated in Fig. 1. Fig. 4 illustrates the outlet of the float chamber communicating with the tail outlet pipe of the structure.

The sub-surface structure 1 is provided with a relatively large chamber 2 for receiving sewer water from a sewer pipe 3. It may be provided with an overflow pipe 4. The structure is also provided with a float chamber 5 that normally communicates with the chamber 2 through a shell 8 having a gate valve 9 located in the float chamber. The gate valve 9 is automatically operated by the change of the level of the water in the float chamber 5.

The float 14 is counter-balanced by means of a suitable weight 15 to produce operation of the valve 9 at relatively slight changes in the level of the liquid in the float chamber. The float 14 may be connected by a sprocket chain 16 to a sprocket wheel 17 located on a shaft 18. The counter-balancing weight 15 may be connected to a sprocket chain 21 which is in turn connected to a sprocket wheel 22 mounted on the shaft 18. The shaft 18 is rotatably supported in bearings located on brackets 23 secured to the walls 24 of the float chamber. The gate valve is connected to the float counter-balancing weight by means of a chain 26.

The outflow of the water is restricted to enable the float to accurately maintain the outflow from the float chamber constant. The restriction raises the level of the water in the float chamber and produces a head that causes the water to flow from the float chamber at desired quantity rate. The water is conducted away from the float chamber by the tail pipe 28, and the outflow is restricted according to the inclination of the tail pipe. An orifice plate 29 is adjustably secured in a plate or dam 31 that may be located in a channel formed in the bottom of the float chamber or may extend to or between one or more of the side walls of the float chamber, such as between the said walls 24. The dam has an orifice 32 and channels 33 for receiving the orifice plate 29 and means, such as the set screws 34, for adjustably securing the orifice plate in position relative to the orifice 32. Variation of the relative position of the orifice plate correspondingly modifies the effective area of the orifice 32 and produces a head that causes a rate of flow through the orifice and into the pipe 28 to maintain a substantially constant depth and a constant quantity flow therein, and at the same time renders the gate valve control mechanism sensitive to changes in level in the float chamber.

The outflow being restricted and the quantity flow in the tail pipe being dependent on the velocity through the orifice, the level of the water in the float chamber may be materially varied without producing a corresponding change in the velocity rate, and since the float varies in position substantially as the level of the water in the float chamber changes, the arrangement provides an exceedingly accurate means for maintaining a constant quantity flow in the tail pipe. The increased depth of the float chamber will be disproportionate to the alteration of the depth of the water in the tail pipe. This maintains within narrow limits a certain quantity flow for if an excess above this predetermined quantity flow is delivered through the regulating gate, then the depth of the water in the float chamber will increase much faster than the depth of the water in the tail pipe. Consequently, the increased depth of the water in the float chamber gives more float travel than it would give if there were no restriction to the flow of the water from the float chamber into the tail pipe. The discharge through the tail pipe by the use of the restricted orifice will be controlled within five per cent above or below any desired quantity while without the use of the flow restricting element, the control of the flow could not be maintained closer than twenty or twenty-five per cent above or below the desired quantity of water.

Thus, the arrangement is such as to accurately maintain a constant quantity flow in the tail pipe, notwithstanding a wide variation of the level of the water in the receiving chamber.

I claim:

1. In a sewer water control, a structure having a receiving chamber and a float chamber and a port interconnecting the lower ends of the chambers, the receiving chamber having a sewer inlet pipe and the float chamber having a sewer outlet pipe, a gate valve for controlling the flow of the sewer water from the receiving chamber to the float chamber, an orifice plate for restricting the cross-sectional area of the stream that enters the outlet pipe from the float chamber to raise the level of the water in the float chamber and produce a head to raise the level of the water in the float chamber disproportionately faster than the level of the water is raised in the outlet pipe, a float located in the float chamber for operating the gate according to the level of the water in the float chamber to cause a constant flow in the outlet pipe.

2. In a sewer water control, a structure having a sewer receiving chamber and a float chamber and a port interconnecting the lower ends of the chambers, the receiving chamber having a sewer inlet pipe and the float chamber having a sewer outlet pipe, a gate valve for controlling the flow of sewer water from the receiving chamber to the float chamber, a float located in the float chamber for operating the gate according to the level of the water in the float chamber, a means for retarding the flow of the water from the float chamber into the outlet pipe.

3. In a sewer water control, a structure having a sewer receiving chamber and a float chamber and a port interconnecting the lower ends of the chambers, the receiving chamber having a sewer inlet pipe and the float chamber having a sewer outlet pipe, an orifice plate located intermediate the float chamber and the outlet pipe and having an orifice smaller than the interior cross-sectional area of the outlet pipe, a gate valve for controlling the flow of the sewer water from the receiving chamber to the float chamber, a float located in the float chamber for operating the gate according to the level of the water in the float chamber and coacting in conjunction with the restricted orifice to maintain a substantially constant head as between the water in the float chamber and the water in the outlet pipe.

CHALMERS S. BROWN.